US008381855B2

(12) United States Patent
Suzuki et al.

(10) Patent No.: US 8,381,855 B2
(45) Date of Patent: Feb. 26, 2013

(54) ALL TERRAIN VEHICLE

(75) Inventors: Yasuhiro Suzuki, Shizuoka (JP);
Motoyuki Hara, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 437 days.

(21) Appl. No.: 12/604,420

(22) Filed: Oct. 23, 2009

(65) Prior Publication Data

US 2011/0094811 A1    Apr. 28, 2011

(51) Int. Cl.
*B60K 13/00*    (2006.01)
(52) U.S. Cl. .................. 180/68.3; 180/296; 180/68.4
(58) Field of Classification Search ........ 180/68.1–68.4, 180/68.6, 291, 296, 309, 312
See application file for complete search history.

(56) References Cited

U.S. PATENT DOCUMENTS

| | | | |
|---|---|---|---|
| 2,216,670 A * | 10/1940 | Klavik ................ | 296/193.07 |
| 5,054,842 A * | 10/1991 | Ishiwatari et al. ........ | 296/191 |
| 5,086,858 A * | 2/1992 | Mizuta et al. ............ | 180/68.3 |
| 5,193,608 A * | 3/1993 | Sekine et al. ............. | 165/41 |
| 5,887,671 A * | 3/1999 | Yuki et al. ............... | 180/68.1 |
| 6,601,667 B2 * | 8/2003 | Buell et al. .............. | 180/229 |
| 6,622,806 B1 * | 9/2003 | Matsuura ................ | 180/68.1 |
| 6,820,708 B2 * | 11/2004 | Nakamura .............. | 180/68.2 |
| 6,988,573 B2 * | 1/2006 | Tsuruta et al. ........... | 180/68.1 |
| 7,022,152 B2 * | 4/2006 | Tsuruta et al. ........... | 55/385.3 |
| 7,096,986 B2 * | 8/2006 | Borroni-Bird et al. ... | 180/68.1 |
| 7,287,619 B2 * | 10/2007 | Tanaka et al. ........... | 180/291 |
| 7,347,296 B2 * | 3/2008 | Nakamura et al. ....... | 180/68.1 |
| 7,363,999 B2 * | 4/2008 | Hastings ................. | 180/220 |
| 7,407,179 B2 * | 8/2008 | Tsuruta et al. ........... | 280/727 |
| 7,438,147 B2 * | 10/2008 | Kato et al. ............... | 180/68.1 |
| 7,475,748 B2 * | 1/2009 | Nakamura et al. ....... | 180/68.1 |
| 7,546,892 B2 * | 6/2009 | Lan et al. ................ | 180/68.2 |
| 7,644,791 B2 * | 1/2010 | Davis et al. ............. | 180/68.1 |
| 7,717,206 B2 * | 5/2010 | Tanaka et al. ........... | 180/68.3 |
| 7,753,427 B2 * | 7/2010 | Yamamura et al. ...... | 296/63 |
| 7,810,596 B2 * | 10/2010 | Tsuchiya ................ | 180/68.5 |
| 7,896,115 B2 * | 3/2011 | Ono et al. ............... | 180/65.31 |
| 7,950,696 B2 * | 5/2011 | Robertson et al. ....... | 280/756 |
| 7,967,100 B2 * | 6/2011 | Cover et al. ............. | 180/312 |
| 8,016,063 B2 * | 9/2011 | Tsuchiya ................ | 180/68.5 |
| 2004/0195018 A1 * | 10/2004 | Inui et al. ............... | 180/68.1 |
| 2004/0206567 A1 * | 10/2004 | Kato et al. .............. | 180/291 |
| 2008/0023249 A1 * | 1/2008 | Sunsdahl et al. ........ | 180/312 |
| 2008/0289896 A1 * | 11/2008 | Kosuge et al. .......... | 180/312 |

FOREIGN PATENT DOCUMENTS

WO    WO 2009/096977    *    8/2009

* cited by examiner

*Primary Examiner* — Katy M Ebner
(74) *Attorney, Agent, or Firm* — Keating & Bennett, LLP

(57) ABSTRACT

In an all terrain vehicle, a radiator is disposed forward of a front panel in a longitudinal direction of the vehicle. The radiator is also disposed in a transverse center of the vehicle. A fan is configured to blow air from the front to an area behind the radiator. An engine unit is disposed rearward of the front panel. A cargo bed is disposed rearward of a seat. An exhaust device is disposed under the cargo bed. The exhaust device is disposed in the transverse center of the vehicle. A communication path is positioned in the transverse center of the vehicle. The communication path connects a space positioned behind the radiator and a space that the exhaust device is disposed. The communication path at least partially overlaps with the fan in a front view of the vehicle.

11 Claims, 9 Drawing Sheets

ALL TERRAIN VEHICLE

BACKGROUND OF THE INVENTION

1. Field of the Invention

The present invention relates to an all terrain vehicle.

2. Description of the Related Art

An all terrain vehicle is provided with a cabin in which a single seat or a plurality of seats and a floor are disposed. The floor is disposed forward of the single or plurality of seats. The floor is used for supporting the feet of a driver and/or a passenger thereon. Additionally, the cabin is sectioned apart from a vehicle body front portion through a front panel. The vehicle body front portion is disposed forward of the cabin, and the front panel stands upward from the floor. For example, US Patent Publication No. US2008/0289896 A1 discloses a conventional all terrain vehicle in which an engine unit is disposed rearward of the front panel. In the all terrain vehicle, an exhaust device is disposed rearward of the engine unit. It is difficult for the all terrain vehicle to enhance cooling of the engine unit and the exhaust device disposed rearward of the engine unit because of the structure that the engine unit is disposed rearward of the front panel.

In response to this, the aforementioned all terrain vehicle is provided with a duct for cooling the engine unit. The duct extends downward from an upper area within the vehicle body front portion disposed forward of the front panel. Additionally, the duct is bent rearward in a lower area within the vehicle body front portion. Furthermore, a protrusion protruding upward from the floor is provided in the transverse center portion of the floor. The protrusion is positioned lower than a seating surface of the seat. Additionally, the protrusion extends in a longitudinal direction of the vehicle. The duct extends rearward and passes through the inner space of the protrusion. The duct reaches an engine room in which the engine unit is disposed. An inlet of the duct is disposed in the interior of the vehicle body front portion and is positioned above the radiator. A hood, forming the upper surface of the vehicle body front portion, is provided with an opening. External air is inhaled into the vehicle body front portion through the opening of the hood. The inhaled air is further inhaled into the duct through the inlet of the duct.

The aforementioned all terrain vehicle is capable of enhancing cooling of the engine by supplying the external air to the engine room via the duct. However, the duct is bent in a steep angle. Ventilation resistance within the duct will be accordingly large. Additionally, external air is spontaneously inhaled through the opening of the hood and passes through the duct. Therefore, air does not easily flow within the duct in the parked vehicle. In this case, air does not easily reach the exhaust device disposed rearward of the engine unit. As a result, it is difficult to enhance cooling of the exhaust device.

SUMMARY OF THE INVENTION

In view of the above, preferred embodiments of the present invention an exhaust device of an all terrain vehicle that provides improved cooling regardless of a driving state and a parking state of the vehicle.

An all terrain vehicle according to a preferred embodiment of the present invention includes a pair of right and left front wheels, at least a pair of right and left rear wheels, a vehicle body frame, a pair of right and left first roof supports, a pair of right and left second roof supports, a pair of right and left roof members, a seat, a floor, a front panel, a radiator, a fan, an engine unit, a cargo bed, an exhaust device and a communication path. The vehicle body frame supports the front wheels and the rear wheels. The first roof supports are provided at lateral sides of the vehicle body frame in a transverse direction of the vehicle, respectively. Each of the first roof supports includes a pipe member extending in a substantially vertical direction of the vehicle. The second roof supports are provided at the lateral sides of the vehicle body frame in the transverse direction of the vehicle. The second roof supports are disposed rearward of the first roof supports in a longitudinal direction of the vehicle. Each of the second roof supports includes a pipe member extending in the substantially vertical direction of the vehicle. The right roof member connects an upper portion of the right first roof support and an upper portion of the right second roof support, whereas the left roof member connects an upper portion of the left first roof support and an upper portion of the left second roof support. The seat is disposed forward of rear ends of the second roof supports in the longitudinal direction of the vehicle in a side view of the vehicle. The floor is disposed in front of and below the seat. The floor is a member arranged to support the feet of a driver and/or a passenger thereon. The front panel extends upward from a front portion of the floor. The radiator is disposed forward of the front panel in the longitudinal direction of the vehicle. The radiator is disposed in a transverse center portion of the vehicle. The fan is configured to blow air from the front to the behind of the radiator in the longitudinal direction of the vehicle. The engine unit is disposed rearward of the front panel in the longitudinal direction of the vehicle. The cargo bed is disposed behind the seat in the longitudinal direction of the vehicle. The exhaust device is disposed under the cargo bed. The exhaust device is disposed in the transverse center portion of the vehicle. The communication path is disposed in the transverse center portion of the vehicle. The communication path is arranged to connect a space positioned behind the radiator in the longitudinal direction of the vehicle and a space that the exhaust device is disposed. The communication path at least partially overlaps with the fan in a front view of the vehicle.

According to a preferred embodiment of the present invention, the communication path is arranged to connect the space positioned behind the radiator and the space in which the exhaust device is disposed. This structure allows air to easily flow from the space positioned behind the radiator to the space in which the exhaust device is disposed. Additionally, the communication path at least partially overlaps with the fan in a front view of the vehicle. Accordingly, when the fan generates airflow, the airflow reaches the communication path via the radiator. As a result, it is possible to enhance cooling of the exhaust device regardless of a driving state and a parking state of the vehicle.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
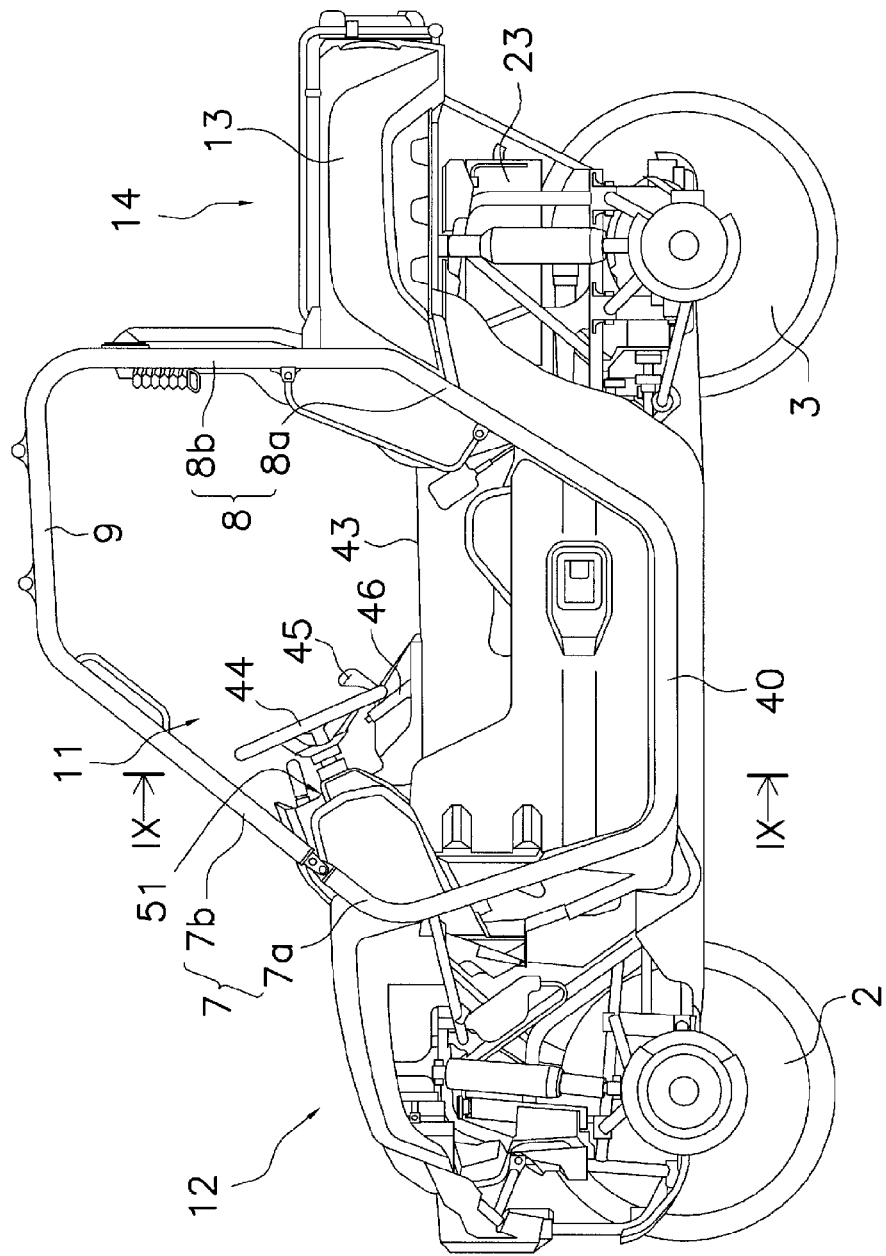
FIG. 1 is a side view of an all terrain vehicle.
Figure 2:
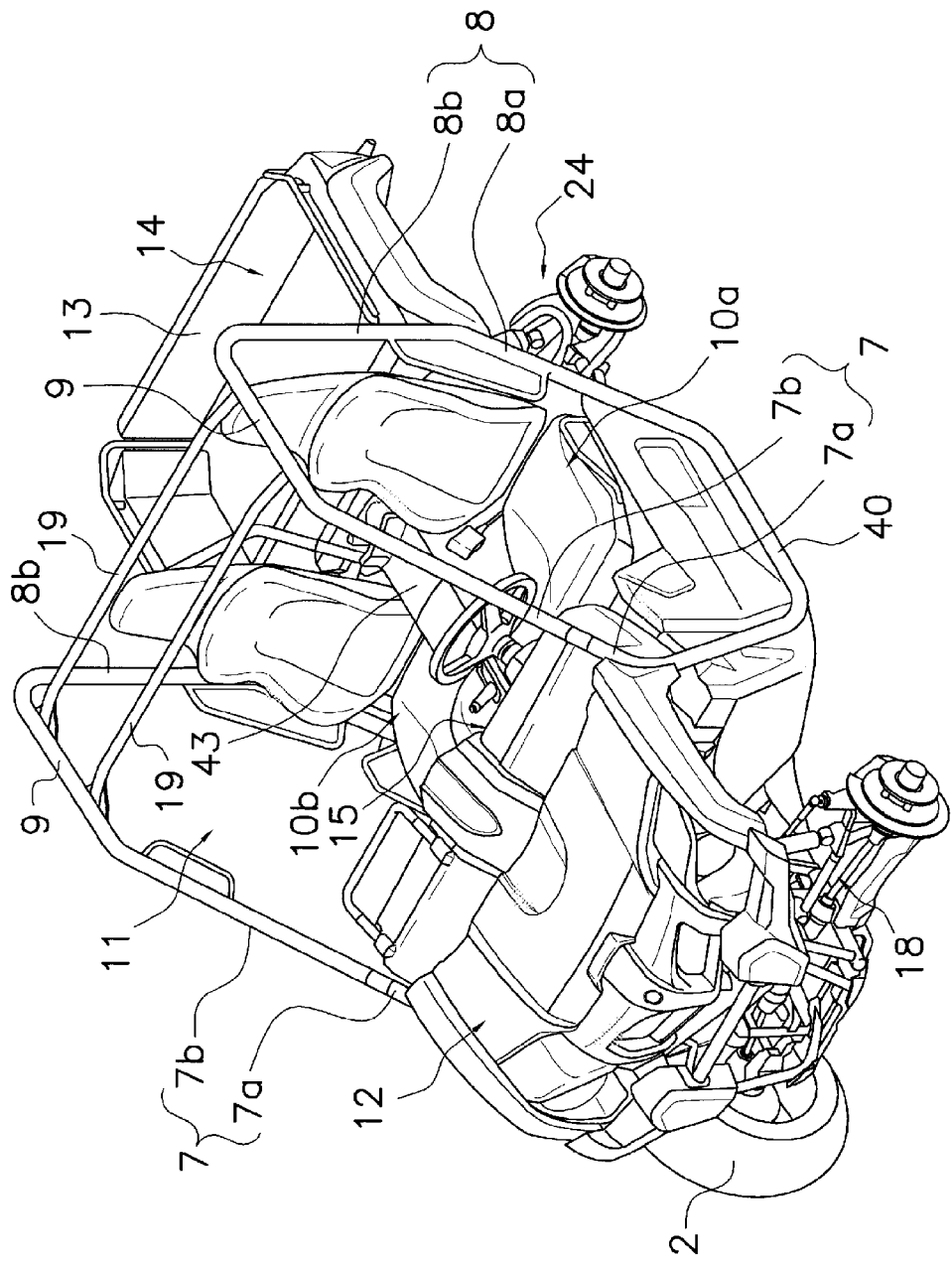
FIG. 2 is a perspective view of appearance of the all terrain vehicle.

An all terrain vehicle according to preferred embodiments of the present invention will be hereinafter explained with reference to the attached figures. FIGS. 1 and 2 illustrate the all terrain vehicle that a left front wheel and a left rear wheel are removed. In the present specification, directional terms "front", "rear", "right" and "left" and their related terms mean directions seen in a condition that a driver and/or a passenger take a seat, excluding special occasions. Similarly, a term "longitudinal direction" means a front-to-rear direction of the vehicle in the condition that a driver and/or a passenger take a seat. On the other hand, a term transverse direction means a right-to-left direction of the vehicle in the condition that a driver and/or a passenger take a seat.

The all terrain vehicle, illustrated in FIGS. 1 to 6, includes a pair of right and left front wheels 2, a pair of right and left rear wheels 3, a vehicle body frame 4, an engine unit 5, a power transmission mechanism 6, and roof forming members. The vehicle body frame 4 supports the front wheels 2 and the rear wheels 3. The roof forming members preferably include a pair of first roof supports 7, a pair of second roof supports 8, and a pair of roof members 9. Additionally, the all terrain vehicle includes a cabin 11, a vehicle body front portion 12 and a vehicle body rear portion 14. The cabin 11 functions as an accommodation space for a driver and/or a passenger. Seats 10a and 10b are disposed in the interior of the cabin 11. The vehicle body front portion 12 includes the front wheels 2. The vehicle body front portion 12 is disposed forward of the cabin 11. The vehicle body rear portion 14 includes the rear wheels 3 and a cargo 13. The vehicle body rear portion 14 is disposed rearward of the seats 10a and 10b. A front panel 15 is disposed between the cabin 11 and the vehicle body front portion 12. The cabin 11 and the vehicle body front portion 12 are thus sectioned apart by the front panel 15.

Figure 4:
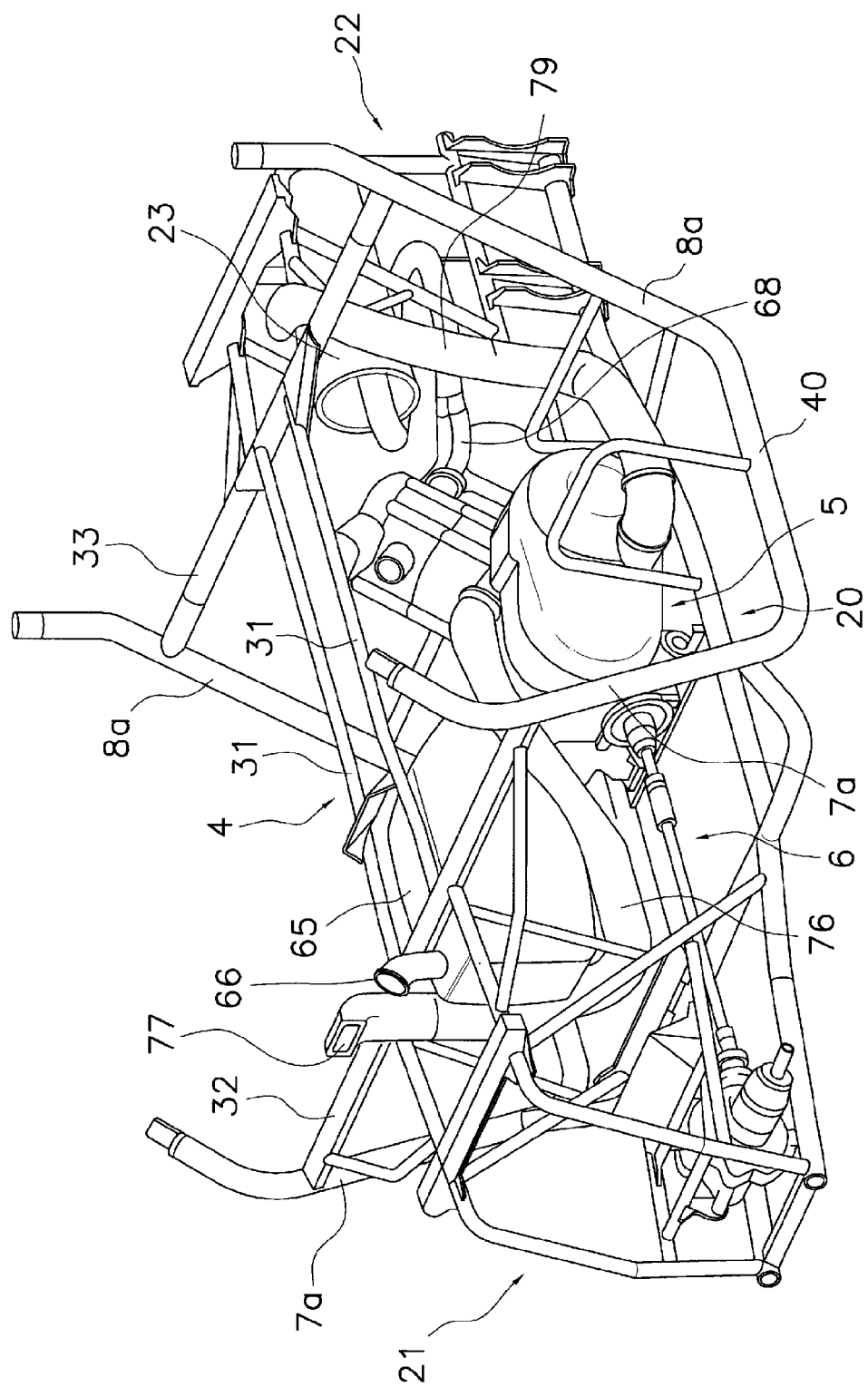
FIG. 4 is a perspective view of a vehicle body frame and main members supported by the vehicle body frame, taken out of the all terrain vehicle.
Figure 6:
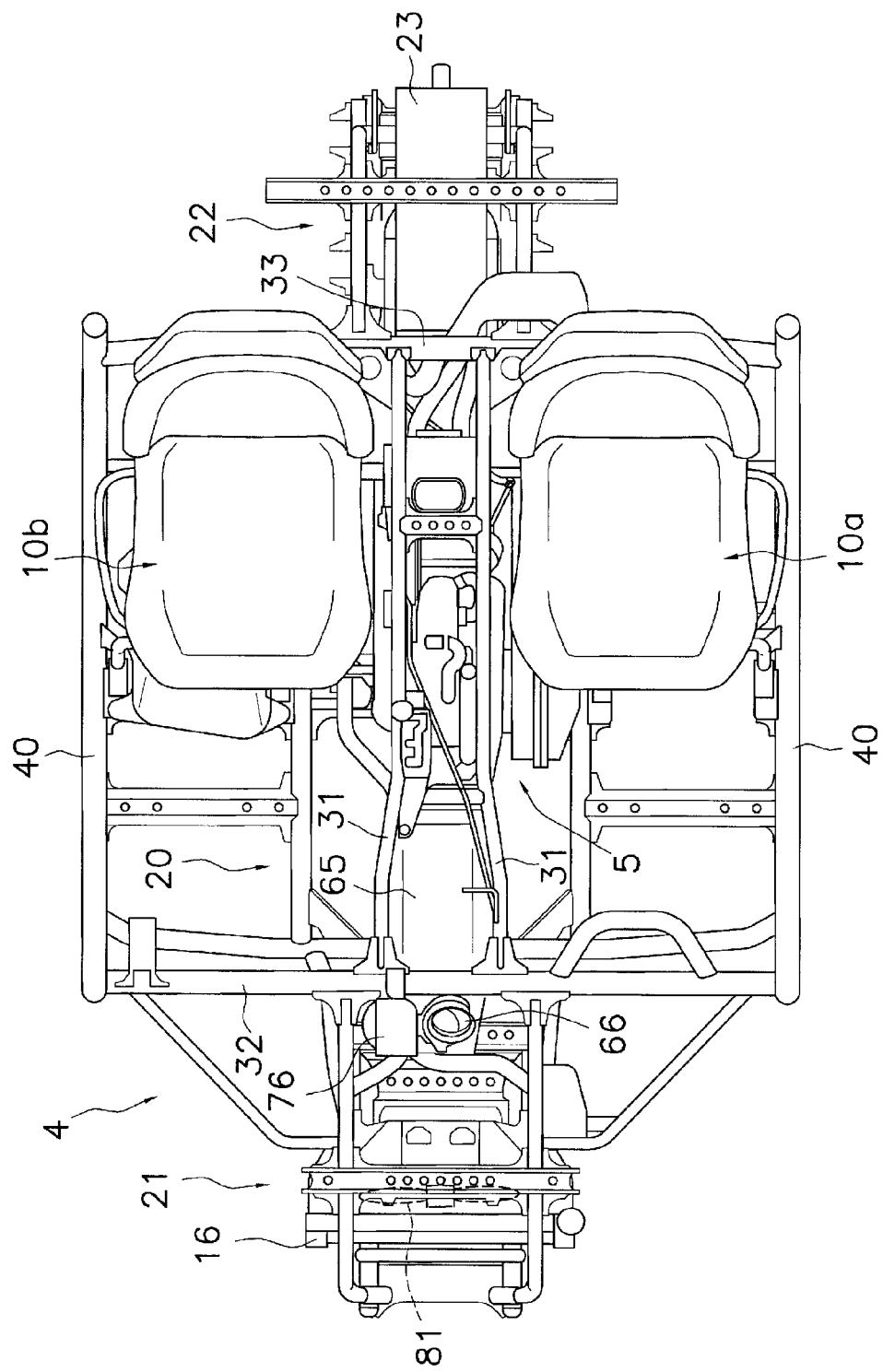
FIG. 6 is a top view of the vehicle body frame and main members supported by the vehicle body frame, taken out of the all terrain vehicle.

As illustrated FIGS. 4 and 6, the vehicle body frame 4 preferably mainly includes a center frame unit 20, a front frame unit 21 and a rear frame unit 22. The center frame unit 20 is positioned at the bottom of the cabin 11. The front frame unit 21 is disposed in front of the center frame unit 20. The front frame unit 21 is included in the vehicle body front portion 12. On the other hand, the rear frame unit 22 is disposed behind the center frame unit 20. The rear frame unit 22 is included in the vehicle body rear portion 14.

The center frame unit 20 preferably includes a plurality of pipe members. The engine unit 5 is supported by the center frame unit 20 through engine brackets (not illustrated in the figure). A pair of intermediate frames 31 is disposed above the center frame unit 20. Each of the intermediate frames 31 includes a pipe member extending in a longitudinal direction of the vehicle. The intermediate frames 31 are disposed in approximately transverse center in the interior of the cabin 11. The intermediate frames 31 are disposed between the seats 10a and 10b in the transverse direction of the vehicle. Additionally, the intermediate frames 31 are transversely separated from each other.

Figure 7:
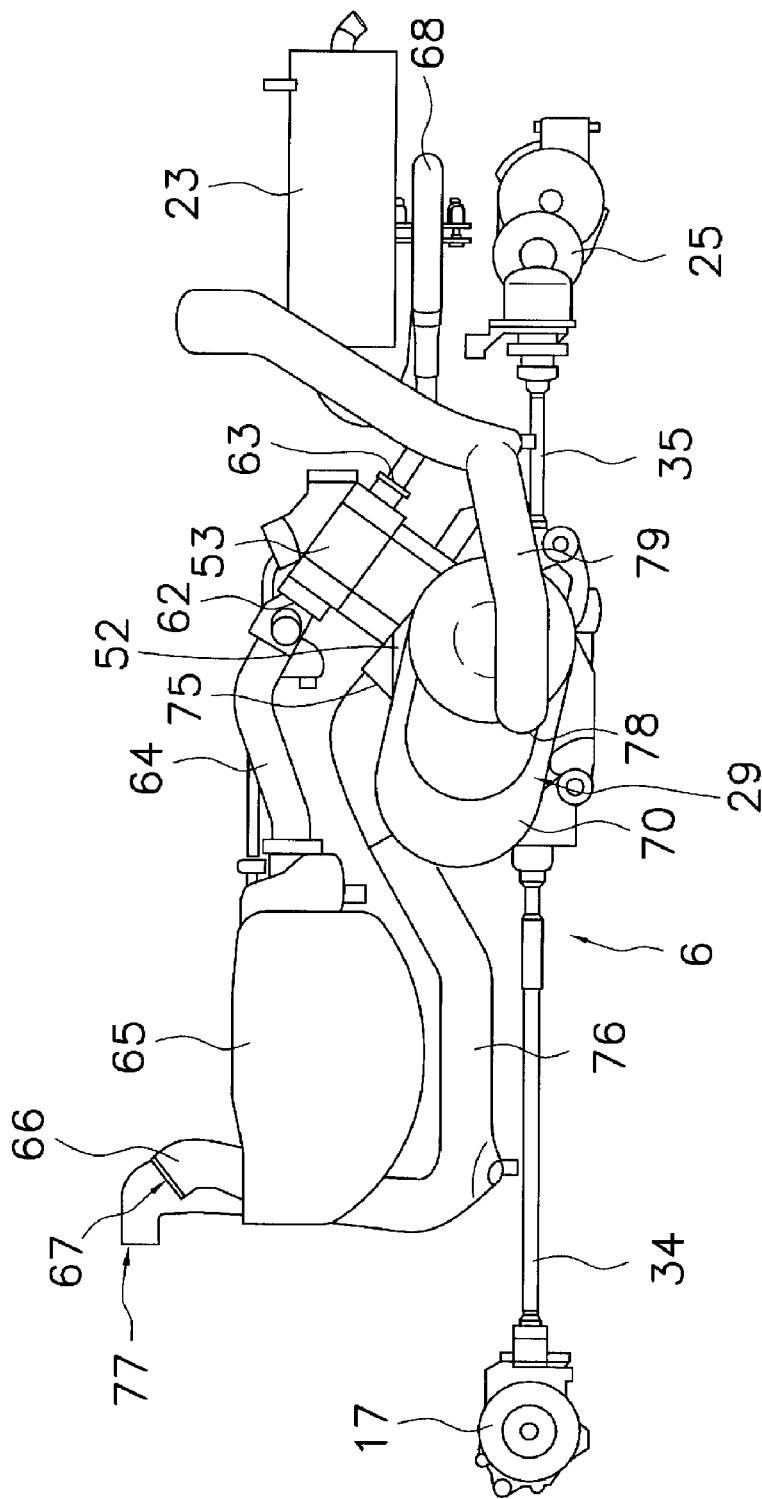
FIG. 7 is a side view of an engine unit and an intake-exhaust related mechanism.

Similarly to the center frame unit 20, the front frame unit 21 preferably includes a plurality of pipe members. As illustrated in FIGS. 6 and 7, the front frame unit 21 supports a variety of components such as a radiator 16, a front gear case 17 and a front suspension mechanism 18 (see FIG. 2). The radiator 16 is disposed in the front portion of a space surrounded by the front frame unit 21. The radiator 16 is disposed in the approximately transverse center of the vehicle. A fan 81 is disposed behind the radiator 16. The fan 81 is capable of revolving around a revolution shaft extending along an approximately longitudinal direction of the vehicle. The fan 81 is driven and revolved by a motor (not illustrated in the figure). The revolution shaft of the fan 81 is disposed in the approximately transverse center of the vehicle. The fan 81 is configured to revolve under a condition that a main switch of the vehicle is turned on and the engine temperature is equal to or greater than a predetermined temperature. When the fan 81 is driven and revolved by the motor, it blows air from the front to the behind of the radiator 16. Alternatively, the fan 81 may be driven regardless of the engine temperature.

Similarly to the center frame unit 20, the rear frame unit 22 preferably includes a plurality of pipe members. The rear frame unit 22 supports a variety of components, such as a muffler 23, a rear suspension mechanism 24 and a rear gear case 25 (see FIG. 2). The muffler 23 is configured to function as an exhaust device. The cargo bed 13 is disposed on the rear frame unit 22. The cargo bed 13 is disposed behind the seat. The muffler 23 is disposed in a space surrounded by the rear frame unit 22. The muffler 23 is disposed below the cargo bed 13. Additionally, the muffler 23 is disposed in the approximately transverse center portion of the vehicle. An engine exhaust pipe 68 (to be described) is disposed below the muffler 23 within the rear frame unit 22.

As described above, the engine unit 5 is supported by the center frame unit 20 through the engine brackets. As illustrated in FIGS. 6 and 7, the engine unit 5 includes an engine body 28 and a V-belt continuously variable transmission 29. The continuously variable transmission (CVT) 29 is disposed on the left side of the engine body 28. The engine body 28, the CVT 29 and the intake-exhaust related mechanism connected to the engine unit 5 will be hereinafter explained in detail.

The power transmission mechanism 6 includes a front drive shaft 34, a rear drive shaft 35, a front gear case 17 and a rear gear case 25. The front drive shaft 34 and the rear drive shaft 35 are connected to the output side of the engine unit 5. The front gear case 17 is disposed among the tip of the front drive shaft 34 and the pair of the front wheels 2, whereas the rear gear case 25 is disposed among the tip of the rear drive shaft 35 and the pair of the rear wheels 3. The power transmission mechanism 6 is configured to transmit driving force of the engine unit 5 to the pair of the front wheels 2 and the pair of the rear wheels 3.

Figure 3:
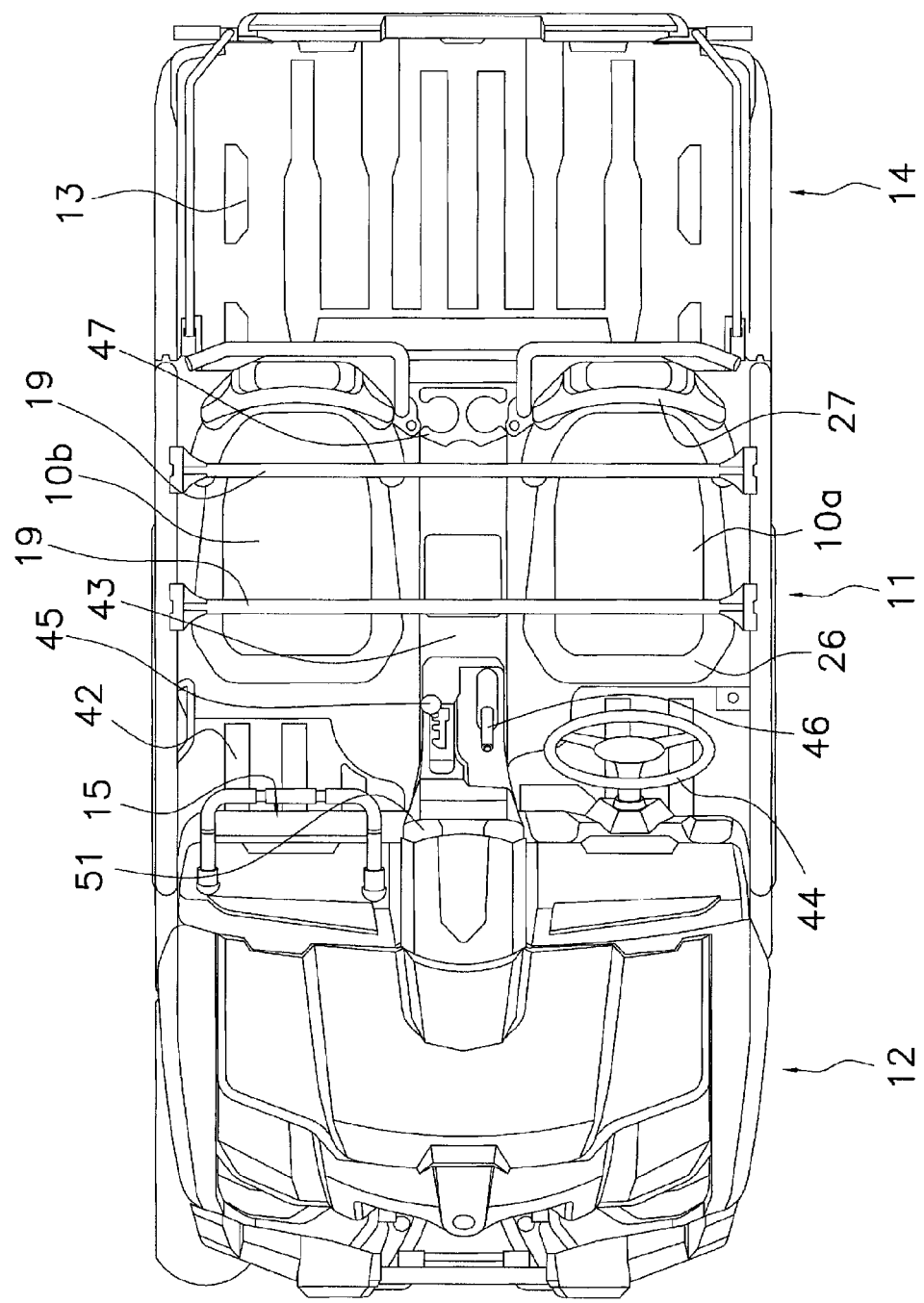
FIG. 3 is a top view of the all terrain vehicle.

As illustrated in FIGS. 1 to 3, the pair of right and left first roof supports 7, the pair of right and left second roof supports 8 and the pair of right and left roof members 9 define a pair of right and left lateral frames of the cabin 11.

The first roof supports 7 define the front ends of the pair of right and left lateral portions of the cabin 11. Each of the first roof supports 7 preferably includes a pipe member extending in the vertical direction. The term "vertical direction" herein is not limited to an exactly perpendicular direction to the horizontal direction, and may be a substantially vertical direction. For example, a component "extending in the vertical direction" may extend in an oblique direction or may be formed in a curved shape. Each of the first roof supports 7 is preferably divided into a lower support 7a and an upper support 7b. The lower support 7a and the upper support 7b are coupled preferably by a single or plurality of bolts, for example. The coupling portion between the lower support 7a and the upper support 7b is positioned at approximately the same height as the upper end of the front panel 15. The lower support 7a slants forward from its lower end to its upper end (i.e., its coupling portion with the upper support 7b). On the other hand, the upper support 7b slants rearward from its lower end (i.e., its coupling portion with the lower support 7a) to its upper end.

Additionally, as illustrated in FIG. 4, a first lateral frame 32 bridges the right and left first roof supports 7. The first lateral frame 32 is a pipe member extending in the transverse direction of the vehicle. The first lateral frame 32 is coupled to the lower supports 7a of the right and left first roof supports 7. Additionally, the aforementioned front frame unit 21 is coupled to the first lateral frame 32. Moreover, the front ends of the aforementioned intermediate frames 31 are coupled to the first lateral frame 32. The front ends of the intermediate frames 31 are welded to the first lateral frame 32.

The second roof supports 8 define the rear ends of the pair of right and left lateral portions of the cabin 11. Each of the second roof supports 8 preferably includes a pipe member extending in the vertical direction. The second roof supports 8 are disposed rearward of the first roof supports 7. Similarly to the first roof supports 7, each of the second roof supports 8 is preferably divided into a lower support 8a and an upper support 8b. The lower support 8a and the upper support 8b are coupled preferably by a single or plurality of bolts, for example. The coupling portion between the lower support 8a and the upper support 8b is positioned at approximately the same height as the upper end of the front panel 15. The lower support 8a slants rearward from its lower end to its upper end (i.e., its coupling portion with the upper support 8b). On the other hand, the upper support 8b is disposed approximately upright in the vertical direction.

Additionally, as illustrated in FIG. 4, a second lateral frame 33 bridges the right and left second roof supports 8. The second lateral frame 33 includes a pipe member extending in the transverse direction of the vehicle. The second lateral frame 33 is coupled to the lower supports 8a of the second roof supports 8. Additionally, the aforementioned rear frame unit 22 is coupled to the second lateral frame 33. Furthermore, the rear ends of the aforementioned intermediate frames 31 are coupled to the second lateral frame 33. The rear ends of the intermediate frames 31 are welded to the second lateral frame 33.

Each of the roof members 9 preferably includes a pipe member extending in the longitudinal direction. The right/left roof member 9 connects an upper portion of the right/left first roof support 7 and an upper portion of the right/left second roof support 8. The roof members 9 are disposed in an approximately horizontal direction. Additionally, as illustrated in FIGS. 2 and 3, beam members 19 bridge the right and left roof members 9. Each of the beam members 19 preferably includes a pipe member extending in the transverse direction of the vehicle. The beam members 19 are coupled to the roof members 9.

The right and left lateral frameworks of the cabin 11 further include a pair of right and left lower members 40 in addition to the first roof supports 7, the second roof supports 8 and the roof members 9. Each of the lower members 40 preferably includes a pipe member. The right/left lower member 40 connects the lower end of the right/left first roof support 7 and the lower end of the right/left second roof support 8. The lower members 40 are disposed in an approximately horizontal direction. Accordingly, the lower members 40 are opposed to the roof members 9 in the vertical direction.

In the present preferred embodiment, the right/left upper support 7b of the right/left first roof support 7, the right/left upper support 8b of the right/left second roof support 8 and the right/left roof member 9 are formed preferably by bending a piece of a pipe member. Similarly, the right/left lower support 7a of the right/left first roof support 7, the right/left lower support 8a of the right/left second roof support 8 and the right/left lower member 40 are preferably formed by bending a piece of a pipe member.

As illustrated in FIG. 3, the cabin 11 is provided with the front panel 15, a bottom floor panel 42, a center console 43 and the seats 10a and 10b. The floor panel 42 is disposed in front of and below the seats 10a and 10b. The floor panel 42 is arranged to support the feet of a driver and/or a passenger. A steering mechanism 44 is provided in front of the left seat 10a within the cabin 11. The seat 10a preferably includes a seating surface 26 and a seat back 27. On the other hand, the seat 10b is disposed lateral to the seat 10a in the transverse direction of the vehicle. The seat 10b has approximately the same structure as the seat 10a. Each of the seats 10a and 10b is disposed forward of the rear ends of the second roof supports 8 within the cabin 11. More specifically, a portion of the seat back 27 overlaps with the second roof supports 8 in the longitudinal direction of the vehicle and the other portion of the seat back 27 is positioned rearward of the second roof supports 8. The seating surface 26 is positioned forward of the rear ends of the second roof supports 8.

Figure 5:
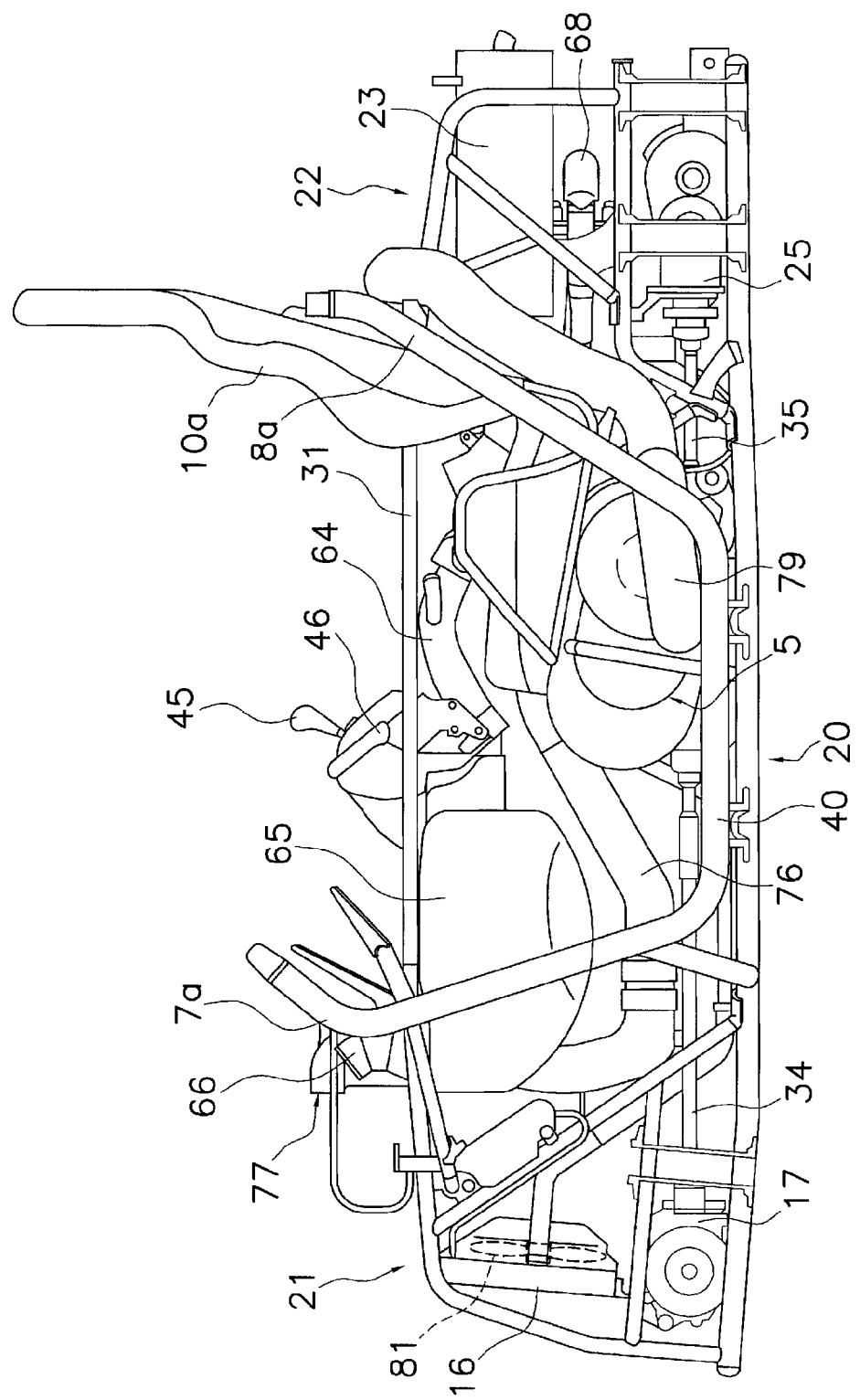
FIG. 5 is a side view of the vehicle body frame and the main members.
Figure 9:
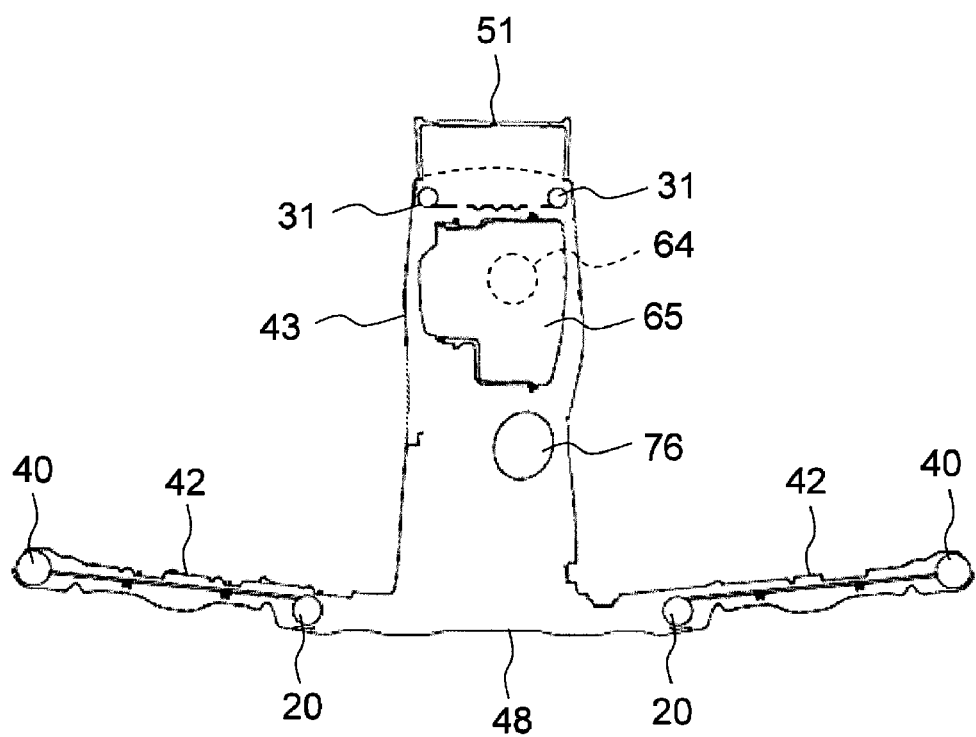
FIG. 9 is a schematic cross-sectional view of the all terrain vehicle of FIG. 1, sectioned along a section line IX-IX.

Furthermore, the center console 43 is disposed in an approximately transverse center of the cabin 11. In other words, the center console 43 passes through the interposed space between the right and left seats 10b and 10a. The center console 43 includes an inverse U-shaped panel. The center console 43 is disposed for covering the area above and to the side of the aforementioned intermediate frames 31 (see FIG. 9). Note that FIG. 9 is a schematic cross-sectional view of the all terrain vehicle of FIG. 1, sectioned along a section line IX-IX. In FIG. 9, illustration of some components is omitted. Additionally, the center console 43 is disposed across the cabin 11 in the longitudinal direction of the vehicle. The center console 43 includes an inner space. The center console 43 connects a space positioned forward of the front panel 15, a space positioned under the seats 10a and 10b, and a space positioned rearward of the seats 10a and 10b. In other words, the center console 43 defines a communication path arranged to connect a space positioned behind the radiator 16 and the fan 81 within the front frame unit 21 and a space within the rear frame unit 22 in which the muffler 23 is disposed. Moreover, the center console 43 preferably has a linear shape. The radiator 16, the fan 81, the center console 43 and the muffler 23 are approximately linearly aligned in a side view and a top view of the vehicle. Therefore, the radiator 16, the fan 81, the center console 43 and the muffler 23 overlap with each other in a front view of the vehicle. Furthermore, as illustrated in FIG. 5, the aforementioned intermediate frames 31 are positioned higher than the upper end of the fan 81. As a result, the upper surface of the center console 43 disposed higher than the intermediate frames 31 is also disposed higher than the upper end of the fan 81. Note the bottom of the inner space of the center console 43 is covered with a plate-shaped bottom guard 48 (see FIG. 9). The bottom guard 48 is disposed along the center frame unit 20.

Note a speed change control lever 45 and a side brake control lever 46 are disposed in the front portion of the center console 43, whereas a bottle receiver 47 is disposed on the rear portion of the center console 43 for receiving a single or plurality of beverage bottles.

As described above, the front panel 15 is a member arranged to section the cabin 11 and the vehicle body front portion 12. The front panel 15 is disposed in front of the seats 10a and 10b. The front panel 15 extends continuously upward from a front portion of the floor panel 42 of the cabin 11. The handle 44 is provided in the left upper portion of the front panel 15, whereas a meter unit 51, including a speedometer and the like, is disposed in the transverse center portion of the front panel 15. The front end of the aforementioned center console 43 is connected to a portion of the front panel 15, positioned below the meter unit 51.

Figure 8:
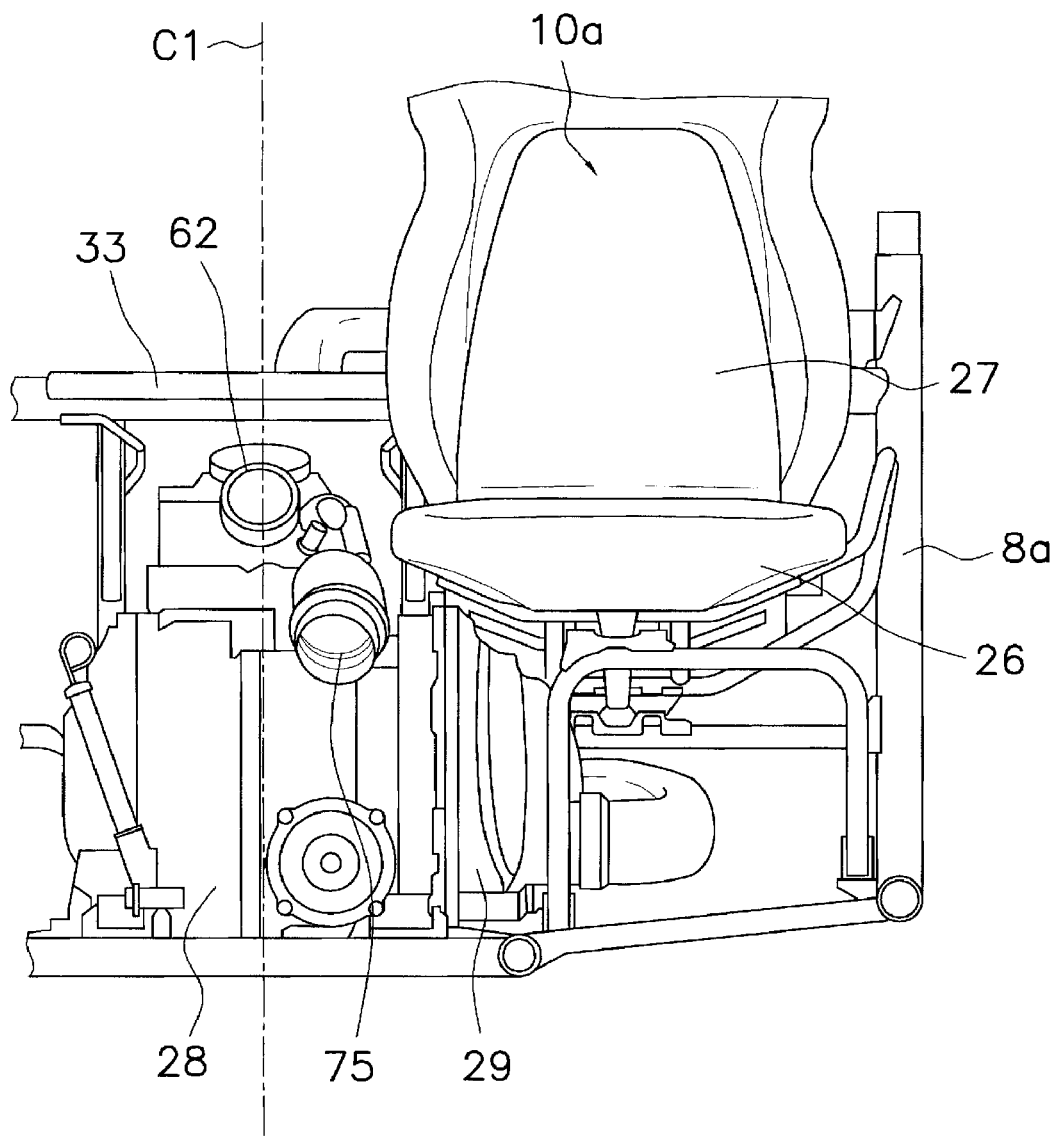
FIG. 8 is a front view for illustrating disposition of the engine unit and a seat.

The engine unit 5 includes the engine body 28 and the CVT 29. Additionally, as illustrated in FIG. 8, the engine body 28 is disposed in the inner space of the center console 43. The engine body 28 is positioned in a center line (see a dashed-dotted line C1) through the transverse center portion of the vehicle. The left portion of the engine body 28 is positioned under the seat 10a. Moreover, as illustrated in FIG. 7, the engine body 28 includes a crank case 52 and a cylinder portion 53. The crank case 52 accommodates a variety of members such as a crank shaft and a speed reduction mechanism (not illustrated in the figure). The cylinder portion 53 is disposed above the crank case 52. The cylinder portion 53 accommodates a piston (not illustrated in the figure). The cylinder portion 53 is provided with an engine intake port 62 and an engine exhaust port 63. The engine intake port 62 and the exhaust port 63 communicate with the inner space of the cylinder portion 53.

The engine intake port 62 is provided in the front surface of the cylinder portion 53. The front surface of the cylinder portion 53 slants rearward from its lower side to its upper side. As illustrated in FIG. 8, the engine intake port 62 is positioned between the right and left seats 10b and 10a in the transverse direction of the vehicle. Additionally, the engine intake port 62 is positioned in the interior of the center console 43. As illustrated in FIGS. 4, 5 and 7, an engine intake duct 64 is connected to the engine intake port 62 for introducing external air into the interior of the engine body 28. The engine intake duct 64 extends forward along the center console 43 in the interior of the center console 43. Additionally, the engine intake duct 64 is connected to an air cleaner 65. The air cleaner 65 is disposed in the interior of the center console 43. An intake pipe 66 is connected to the front portion of the upper surface of the air cleaner 65. The intake pipe 66 extends upward from the upper surface of the air cleaner 65, and is bent rearward. The intake pipe 66 is positioned forward of the first lateral frame 32. Additionally, an inlet 67 is provided in the tip of the intake pipe 66.

The engine exhaust port 63 is provided in the rear surface of the cylinder portion 53. The rear surface of the cylinder portion 53 slants rearward from its lower side to its upper side. An engine exhaust pipe 68 is connected to the engine exhaust port 63 for discharging air to the outside from the interior of the engine body 28. The engine exhaust pipe 68 extends rearward from the engine exhaust port 63, and is folded to the forward in the rear frame unit 22. The engine exhaust pipe 68 is connected to the muffler 23 disposed in the rear frame unit 22.

The CVT 29 is disposed on the left side of the engine body 28. As illustrated in FIG. 8, the CVT 29 is disposed under the seat 10a. Additionally, the CVT 29 includes a transmission case 70. The transmission case 70 is attached to the left surface of the crank case 52. The transmission case 70 accommodates a variety of components such as a primary pulley, a secondary pulley and a belt wrapped around the primary pulley and the secondary pulley (not illustrated in the figure).

As illustrated in FIGS. 7 and 8, an intake port 75 is provided in the upper surface of the aforementioned crank case 52. The intake port 75 is disposed between the right and left seats 10b and 10a in the transverse direction of the vehicle. Additionally, the intake port 75 is positioned in the interior of the center console 43.

An intake duct 76 is connected to the intake port 75 for introducing external air into the interior of the CVT 29. The intake duct 76 extends forward from the upper surface of the crank case 52. The intake duct passes through the interior of the center console 43. The intake duct 76 vertically overlaps with the engine intake duct 64 in the interior of the center console 43 (see FIG. 9). The intake duct 76 passes through a space below the air cleaner 65. The intake duct 76 is bent upward from the position below the air cleaner 65. The intake duct 76 passes through the right side of the air cleaner 65 in the front frame unit 21. Additionally, the intake duct 76 extends to a position higher than the air cleaner 65. An inlet 77 is provided in the tip of the intake duct 76. The inlet 77 is disposed forward of the first lateral frame 32 and the front panel 15.

As illustrated in FIG. 7, an exhaust port 78 is provided in the left surface of the aforementioned transmission case 70. An exhaust duct 79 is connected to the exhaust port 78 for discharging air to the outside from the interior of the CVT 29. The exhaust duct 79 extends rearward from the left surface of the transmission case 70. As illustrated in FIGS. 4 and 5, the exhaust duct 79 is bent transversely inward in a position rearward of the seat 10a. Additionally, the exhaust duct 79 extends upward in a position behind the seat 10a. The exhaust duct 79 passes through behind the seat 10a and the left side of the rear frame unit 22 and extends to a position higher than the muffler 23. An outlet is provided in the tip of the exhaust duct 79.

According to the all terrain vehicle of the present preferred embodiment, the center console 43 defines a communication path arranged to connect a space positioned behind the radiator 16 and a space in which the muffler 23 and the engine exhaust pipe 68 are disposed. The structure allows air to easily flow from the space positioned behind the radiator 16 to the space in which the muffler 23 and the engine exhaust pipe 68 are disposed. Additionally, the center console 43 overlaps with the fan 81 in a front view of the vehicle. Therefore, when the fan 81 generates airflow, the airflow flows from the front to the rear of the radiator 16 and reaches the interior of the center console 43. The center console 43 is preferably linearly shaped, and thereby ventilation resistance within the center console 43 is relatively small. This allows air to easily flow in the interior of the center console 43. As a result, it is possible to enhance cooling of the muffler 23 and the engine exhaust pipe 68 regardless of a driving state and a parking state of the vehicle.

According to the all terrain vehicle of the present preferred embodiment, the engine unit 5 is disposed in the inner space of the center console 43. The structure allows the external air to easily reach the engine unit 5. As a result, it is possible to enhance cooling of the engine unit 5. Additionally, the engine unit 5 is partially positioned under the seat 10a. Therefore, it is possible to achieve compactness of the vehicle or enlargement of the cabin space.

According to the all terrain vehicle of the present preferred embodiment, the engine intake duct 64 is disposed in the interior of the center console 43. The structure reliably inhibits reduction of the cabin space to be caused in the conventional disposition of the engine intake duct 64.

The specific structure and disposition of the all terrain vehicle of the present invention are not limited to the aforementioned preferred embodiment. They are allowed to be changed without departing from the scope of the present invention. For example, the aforementioned preferred embodiment exemplifies the structure that each of the roof supports is preferably divided into the upper support and the lower support. However, the present invention is applicable to a type of vehicle that a roof support is only composed of the upper support of the aforementioned preferred embodiment. Additionally, in the aforementioned preferred embodiment, the present invention is preferably applied to a type of vehicle provided with two seats. However, the present invention is similarly applicable to a type of vehicle provided with a single or plurality of rear seats in addition to the front seats. Also, the shape of the lateral frames is not limited to the liner shape as described in the aforementioned preferred embodiment. For example, the lateral frames may be formed in a vertically curved shape or a longitudinally curved shape. Moreover, in the aforementioned preferred embodiment, the upper surface of the center console is positioned higher than the upper end of the fan. However, the center console may be arbitrarily positioned as long as the center console at least partially overlaps with the fan in a front view of the vehicle. For example, the upper surface of the center consol may be positioned higher than the lower end of the fan 81. Furthermore, the center console preferably has a linear shape. However, the center console may have a bent shape as long as ventilation resistance thereof is not excessively increased.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An all terrain vehicle comprising:
    a pair of right and left front wheels;
    at least a pair of right and left rear wheels;
    a vehicle body frame arranged to support the front wheels and the rear wheels;
    a pair of right and left first roof supports, each of the first roof supports including a pipe member extending in a substantially vertical direction of the vehicle, the first roof supports being provided at lateral sides of the vehicle body frame in a transverse direction of the vehicle, respectively;
    a pair of right and left second roof supports, each of the second roof supports including a pipe member extending in the substantially vertical direction of the vehicle, the second roof supports being disposed rearward of the first roof supports in a longitudinal direction of the vehicle, the second roof supports being provided at the lateral sides of the vehicle body frame in the transverse direction of the vehicle, respectively;
    a pair of right and left roof members, the right roof member connecting an upper portion of the right first roof support and an upper portion of the right second roof support, the left roof member connecting an upper portion of the left first roof support and an upper portion of the left second roof support;
    a seat disposed forward of rear ends of the second roof supports in the longitudinal direction of the vehicle in a side view of the vehicle;
    a floor arranged to support feet of a driver and/or a passenger thereon, the floor being disposed in front of and below the seat;
    a front panel extending upward from a front portion of the floor;
    a radiator disposed forward of the front panel in the longitudinal direction of the vehicle and in a transverse center portion of the vehicle;
    a fan arranged to blow air from a front to a rear of the radiator in the longitudinal direction of the vehicle;
    an engine unit disposed rearward of the front panel in the longitudinal direction of the vehicle;
    a cargo bed disposed behind the seat in the longitudinal direction of the vehicle;
    an exhaust device disposed under the cargo bed and in the transverse center portion of the vehicle; and
    a communication path arranged to allow external air to flow from a space positioned behind the radiator in the longitudinal direction of the vehicle to a space in which the exhaust device is disposed, the communication path being disposed in the transverse center portion of the vehicle and at least partially defined by a center console extending in the longitudinal direction of the vehicle; wherein
    the communication path includes:
        an engine intake duct arranged to provide external air into an engine intake port of a cylinder portion of the engine unit; and
        an intake duct, separate from the engine intake duct, arranged to provide external air into an intake port of a continuously variable transmission.

2. The all terrain vehicle according to claim 1, wherein an upper end of the center console is positioned higher than a lower end of the fan.

3. The all terrain vehicle according to claim 1, wherein an upper end of the center console is positioned higher than an upper end of the fan.

4. The all terrain vehicle according to claim 1, wherein the engine unit is disposed inside the center console and the engine unit is at least partially positioned under the seat.

5. The all terrain vehicle according to claim 1, wherein an entire length of the communication path has a linear shape in a side view of the vehicle.

6. The all terrain vehicle according to claim 1, wherein a front entrance of the communication path at least partially overlaps with the fan in a front view of the vehicle.

7. The all terrain vehicle according to claim 1, wherein the seat includes a right seat and a left seat, and the center console is at least partially disposed between the right seat and the left seat.

8. The all terrain vehicle according to claim 7, wherein the center console separates the right seat from the left seat.

9. The all terrain vehicle according to claim 1, wherein an upper end of the center console is positioned higher than a seating surface of the seat.

10. The all terrain vehicle according to claim 1, wherein the center console includes an open front entrance and an open rear entrance to allow the external air to flow from the space positioned behind the radiator to the space in which the exhaust device is disposed.

11. The all terrain vehicle according to claim 1, wherein the engine intake duct includes an air cleaner.

* * * * *